(12) United States Patent
Morita

(10) Patent No.: US 7,284,975 B2
(45) Date of Patent: Oct. 23, 2007

(54) MANUFACTURING APPARATUS FOR AIRBAG COVER

(75) Inventor: Masaru Morita, Ritto (JP)

(73) Assignee: Takata Corporation, Tokyo (JP)

( * ) Notice: Subject to any disclaimer, the term of this patent is extended or adjusted under 35 U.S.C. 154(b) by 20 days.

(21) Appl. No.: 11/183,913

(22) Filed: Jul. 19, 2005

(65) Prior Publication Data

US 2006/0022436 A1 Feb. 2, 2006

(30) Foreign Application Priority Data

Jul. 29, 2004 (JP) ............................. 2004-222585

(51) Int. Cl.
*B29B 13/00* (2006.01)
(52) U.S. Cl. .................... 425/142; 425/289; 83/881
(58) Field of Classification Search ............. 425/174.2, 425/291, 289, 142; 264/442; 156/73.3; 83/879, 880, 881
See application file for complete search history.

(56) References Cited

U.S. PATENT DOCUMENTS

| | | | |
|---|---|---|---|
| 5,833,356 A * | 11/1998 | Yamamoto et al. | ......... 362/294 |
| 6,337,461 B1 | 1/2002 | Yasuda et al. | |
| 6,737,607 B2 * | 5/2004 | Nicholas et al. | ......... 219/121.7 |
| 6,835,346 B1 | 12/2004 | Ikawa | |
| 2002/0063417 A1 | 5/2002 | Merrifield et al. | |
| 2005/0147476 A1 | 7/2005 | Wieners | |

FOREIGN PATENT DOCUMENTS

| | | |
|---|---|---|
| DE | 203 14 281 U1 | 6/2004 |
| EP | 1 162 054 A1 | 12/2001 |
| EP | 1 177 878 A1 | 2/2002 |
| JP | 2001-233164 | 8/2001 |
| JP | 2002-86397 | 3/2002 |

* cited by examiner

*Primary Examiner*—Robert Davis
*Assistant Examiner*—Maria Veronica Ewald
(74) *Attorney, Agent, or Firm*—Foley & Lardner LLP

(57) ABSTRACT

A technique and apparatus for effectively constructing a cover for covering a vehicle airbag is provided. An ultrasonic machine is used that includes an ultrasonic machining blade for machining a tear line in the cover rear surface of the airbag cover. First and second transmitting displacement sensors are disposed on the opposite side of the cover rear surface of the airbag cover so as to be opposed to a cutting edge of the ultrasonic machining blade with the airbag cover interposed therebetween. The sensors directly sense the distance between the cutting edge of the machining blade and each of the first and second displacement sensors and through the airbag cover. A control section controls the relative position of the cutting edge with respect to the airbag cover, based on the sensed results by the first and second displacement sensors.

5 Claims, 4 Drawing Sheets

MANUFACTURING APPARATUS FOR AIRBAG COVER

BACKGROUND

The present invention relates to a manufacturing technique for producing a cover for a vehicle airbag. Generally, in an airbag unit mounted on a vehicle, there is provided an airbag cover for covering the vehicle airbag. The airbag cover has a tear line (a linear groove) on its inner wall surface. Upon collision of the vehicle, the airbag cover is torn open along this tear line, and allows the vehicle airbag cover to be deployed and inflated toward the outside of the airbag cover. As a technique for providing the tear line by post-processing, a technique using laser cutting is disclosed in PCT Japanese Translation Patent Publication No. 2001-502996 (incorporated herein by reference). This patent document sets forth the possibility of forming a tear line using laser cutting. However, when manufacturing this type of airbag cover, a technique effective in accurately machining a tear line with a desired shape in the airbag cover is needed.

SUMMARY

According to one embodiment of the invention, an apparatus for manufacturing an airbag cover for covering a vehicle airbag forms a linear groove having a depth falling within the range of the thickness of the airbag cover in a work surface of the airbag cover. The apparatus for manufacturing an airbag cover comprises a blade-shaped member for machining the linear groove in the work surface, a transmitting displacement sensor disposed on the opposite side of the work surface of the airbag cover so as to be opposed to a working tip of the blade-shaped member with the airbag cover interposed therebetween, the transmitting displacement sensor directly sensing the distance between the working tip of the blade-shaped member and the surface of the sensor through the airbag cover and a control section for controlling the relative position of the working tip with respect to the airbag cover based on the sensed result by the transmitting displacement sensor.

According to another embodiment of the invention, the blade-shaped member is configured so that the working tip has an area of not more than 1.5 times the area of the sensor surface of the transmitting displacement sensor.

In yet another embodiment of the invention, the blade-shaped member is configured so that the working tip is composed of an electrically conductive material.

In still another embodiment of the invention, the control section derives information on the remaining thickness of the airbag cover in the linear groove after the linear groove has been machined in the work surface of the airbag cover based on the distance between the sensor surface of the transmitting displacement sensor and the working tip of the blade-shaped member, the distance having been directly sensed by the transmitting displacement sensor.

According to another embodiment of the invention, the apparatus for manufacturing an airbag cover for covering a vehicle airbag further comprises an output section for outputting information derived by the control section.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
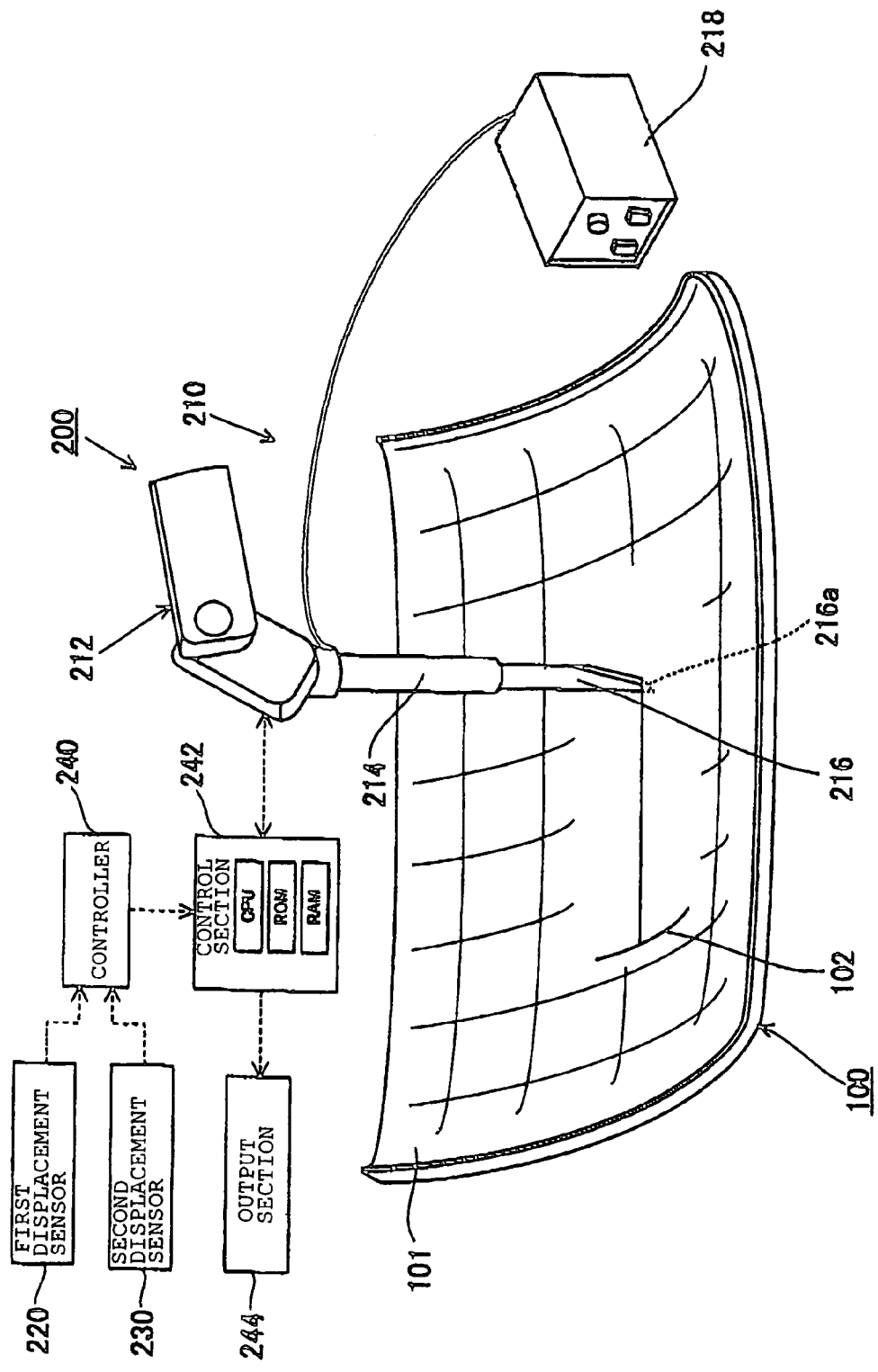
FIG. 1 is a block diagram showing an airbag cover and an ultrasonic machine used for machining the airbag, according to one embodiment of the present invention.

Embodiments of the present invention will be described below with reference to the accompanying drawings. It should be understood that the following description is intended to describe exemplary embodiments of the invention, and not to limit the invention.

An object of an embodiment of the present invention is to provide a technique effective in reasonably constructing an airbag cover for covering a vehicle airbag. Specifically, the invention pertains to a technique applicable to the manufacturing of airbag covers to be mounted on various vehicles such as automobiles, electric trains, motorcycles (saddle-ride vehicles), aircraft, ships, etc.

The airbag cover manufacturing apparatus is capable of continuously forming a linear groove in the work surface of an airbag cover. The linear groove is a line-shaped groove constructed by continuously forming a groove having a depth falling within the thickness of the plate-shaped airbag cover in the work surface. This linear groove refers to a groove-shaped portion having a relatively small thickness and is called a "tear line." The airbag cover is torn open along this linear groove when the vehicle airbag is deployed and inflated upon collision.

According to one embodiment of the present invention, the manufacturing apparatus for an airbag cover includes at least a blade-shaped member, a transmitting displacement sensor, and a control section. The blade-shaped member is capable of machining a linear groove in a work surface of the airbag cover. Here, the "blade-shaped member" broadly includes a blade-shaped structure capable of machining a linear groove in the airbag cover as a workpiece. A structure performing ultrasonic machining (cutting work) with respect to a workpiece by causing a blade-shaped member (ultrasonic machining blade) to work on the workpiece, or "an ultrasonic cutter," is a typical example of the blade-shaped member. In addition, the blade-shaped member according to one embodiment of the invention may include various kinds of cutters employed for cutting work, such as a blade, a rotary blade, a thermal blade, a drill, an end mill, a needle, or a waterjet nozzle capable of cutting a workpiece by ejecting water at a high velocity.

According to one embodiment of the invention, a transmitting displacement sensor is disposed on the opposite side of the work surface of the airbag cover so as to be opposed to the working tip of the blade-shaped member with the airbag cover interposed therebetween, and is capable of directly sensing the distance between the working tip of the blade-shaped member and the sensor surface through the airbag cover. In particular, the present invention is characterized by a construction in which the working tip of the blade-shaped member, that is, the portion contributing to the working of the airbag cover, is directly sensed by the transmitting displacement sensor. This makes it possible to minimize factors causing deviations or errors allowing for high-accuracy sensing as compared with other devices that indirectly sense the working tip of the blade-shaped member. The transmitting displacement sensor is suitably disposed in an airbag cover receiving jig, on which the airbag cover is mounted during the machining of the airbag cover. In a state where the transmitting displacement sensor is disposed on the opposite side of the work surface of the airbag cover with a definite interval interposed therebetween, the sensing by the transmitting displacement sensor is performed at a predetermined timing, allowing the distance between the working tip of the blade-shaped member and the sensor surface to be obtained through the airbag cover. According to one embodiment of the invention, the transmitting displacement sensor comprises an eddy current type displacement sensor and a high-frequency oscillation type electromagnetic induction displacement sensor.

The transmitting displacement sensor has various arrangements. Its configuration modes include a first mode in which the transmitting displacement sensor is moved in keeping with the movement of the working tip associated with the machining of a linear groove by an ultrasonic machining type blade-shaped member. In a second configuration mode, one or a plurality of transmitting displacement sensors are fixedly disposed with respect to the airbag cover although the working tip is moving under a working process. The first mode is suitably used when the distance between the transmitting displacement sensor and the working tip is successively (continuously) sensed while the airbag cover is being worked on. On the other hand, the second mode is suitably used when the distance between the transmitting displacement sensor and the working tip is temporarily sensed at one or a plurality of preset fixed points, prior to the start of the working of the airbag cover or during the working of the airbag cover.

The control section, according to one embodiment of the present invention, controls the relative position of the working tip with respect to the airbag cover. Specifically, the control section controls the position of the blade-shaped member so that the distance between the transmitting displacement sensor and the working tip to be sensed thereby conforms to the distance between the transmitting displacement sensor and the working tip at the time when the working tip is set up at a position corresponding to a desired depth of a linear groove, and so that a desired locus of the linear groove is formed. Thereby, the working operation of the ultrasonic machining type blade-shaped member is controlled so that a desired locus corresponding to a preset shape of the linear groove is provided.

As described above, according to one embodiment of the invention, directly sensing the working tip of the blade-shaped member with the transmitting displacement sensor allows the distance between the transmitting displacement sensor and the working tip to be sensed with high accuracy, thereby enabling a linear groove having a desired shape to be accurately machined in the airbag cover.

According to another embodiment of the invention, the blade-shaped member of the airbag cover manufacturing apparatus is configured so that the working tip thereof has an area of not more than 1.5 times the area of the sensor surface of the transmitting displacement sensor. Here, the area of the "working tip" is defined as an area occupied by the portion contributing to the working of the airbag cover in the tip part of the blade-shaped member. On the other hand, the area of the "sensor surface" is defined as an area occupied by the portion contributing to the sensing of an object to be sensed. This aspect is implemented by a mode in which the area of the working tip of the blade-shaped member is set to be not more than 1.5 times the area of the sensor surface of the transmitting displacement sensor, or a mode in which the area of the sensor surface of the transmitting displacement sensor is set to be not less than ⅔ times the area of the working tip of the blade-shaped member. With these features, the present invention allows the distance between the transmitting displacement sensor and the working tip to be sensed with higher accuracy.

According to another embodiment of the invention, the blade-shaped member is configured so that the working tip is composed of an electrically conductive material. Here, the "electrically conductive material" broadly includes electrically conductive materials suitable for machining a linear groove in the airbag cover. Typically, iron or an alloy of iron can be suitably used as an electrically conductive material. With these features, the present invention enables the sensing accuracy of the transmitting displacement sensor with respect to the working tip to be further improved.

According to another embodiment of the invention, the airbag cover manufacturing apparatus further includes an output section. In addition, the control section can also derive information on the remaining thickness of the airbag cover in the linear groove after the linear groove has been machined in the work surface of the airbag cover, based on the distance between the sensor surface of the transmitting displacement sensor and the working tip of the blade-shaped member, the distance having been directly sensed by the transmitting displacement sensor. In addition, the output section has the function of outputting the information derived by the control section. Thereby, information on the remaining thickness of the airbag cover after a linear groove has been actually machined in the work surface of the airbag cover by the blade-shaped member, i.e., information on the airbag cover thickness remaining because of the linear groove machining, is derived and outputted. This allows a manufacturing manager access to the manufacturing histories of airbag covers on each of which a linear groove has actually been machined based on this outputted information. In addition, as the output section for this invention, an arrangement for outputting information on the remaining thickness of the airbag cover by a screen display, an arrangement for outputting it by printing, an arrangement for outputting it by voice, or a combination of a plurality of arrangements out of these arrangements can be used as appropriate. In the present invention, "information on the remaining thickness of the airbag cover" broadly includes data obtained by digitizing the remaining thickness itself of the airbag cover, and data capable of expressing the level of the remaining thickness of the airbag cover by a grade.

The features of the airbag cover manufacturing apparatus, according to one embodiment of the present invention, makes it possible not only to accurately machine a linear groove with a desired shape in the airbag cover, but also to reasonably perform the management of manufacturing histories of products each having a linear groove machined in the airbag cover by post-processing, by outputting information on the airbag cover remaining thickness after the linear groove has actually been machined. Above all, since the transmitting displacement sensor according to the present invention is configured to directly sense the working tip of the blade-shaped member, information on the airbag cover remaining thickness derived from the distance directly sensed by the transmitting displacement sensor has high accuracy. Therefore, the airbag cover manufacturing apparatus according to the present invention is especially effective in performing the management of manufacturing histories of products.

As described above, according to one embodiment of the present invention, by providing a manufacturing apparatus that forms a linear groove having a depth falling within the thickness of the airbag cover in the work surface of the airbag cover for covering a vehicle airbag, it is possible to accurately machine a linear groove having a desired shape in the airbag cover, especially by using a transmitting displacement sensor for directly sensing the distance therefrom to the working tip of the blade-shaped member through the airbag cover.

The present invention will now be described with reference to the drawings. According to one embodiment of the invention, a technique for forming a tear line 102 in a cover rear surface 101 of an airbag cover 100 for covering a vehicle airbag cover uses an ultrasonic machining method and process. The airbag cover 100 corresponds to the "airbag cover" in this invention, and the cover rear surface 101 of the airbag cover 100 corresponds to the "work surface" in this invention.

Figure 2:
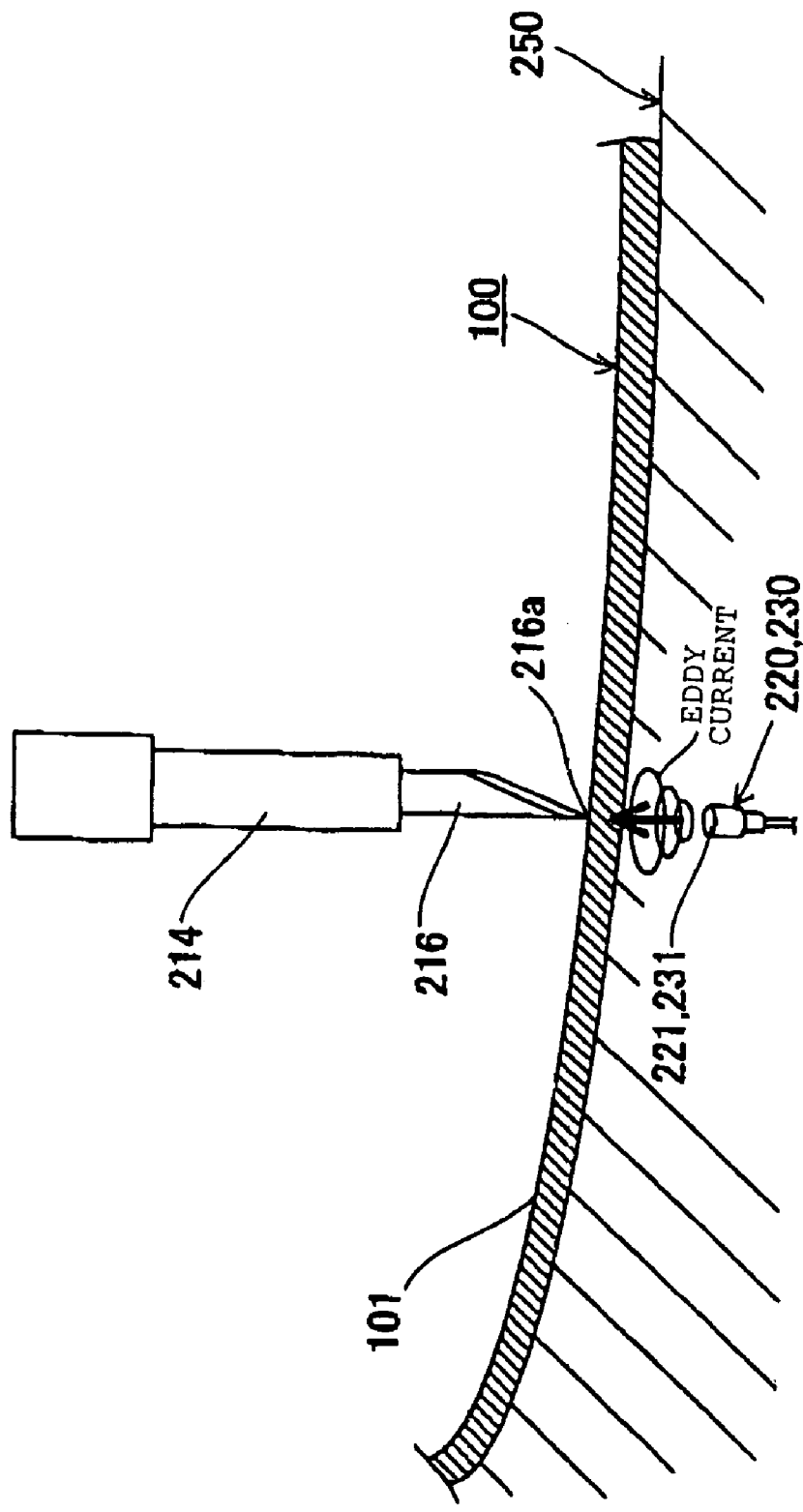
FIG. 2 is a schematic view showing a usage mode of a first displacement sensor and a second displacement sensor each constituting the ultrasonic machine shown in FIG. 1.

First, the construction of the airbag cover 100 and an ultrasonic machine 200 are described with reference to FIGS. 1 and 2. The ultrasonic machine 200 corresponds to the "apparatus for manufacturing an airbag cover" in the present invention. FIG. 1 shows the construction of the airbag cover 100 and the ultrasonic machine 200 used for working on this, according to one embodiment of the present invention. FIG. 2 shows the outline of a usage mode of a first displacement sensor 220 and a second displacement sensor 230 constituting the ultrasonic machine 200 in FIG. 1.

The airbag cover 100 shown in FIG. 1 is a plate-shaped one that is three-dimensionally molded of a resin material such as polypropylene (PP) or an olefinic elastomer (TPO). Here, the cover rear surface 101 of the airbag cover 100 is defined as a surface on the rear side at the time when the side of the airbag cover 100 facing an occupant in a state where the airbag cover 100 is installed is assumed to be a front surface. The tear line 102 is a thinned portion provided for allowing the airbag cover 100 to be torn open there along upon deployment and inflation of the vehicle airbag. In the present embodiment, the tear line 102 is constituted of a linear groove formed in the cover rear surface 101 of the airbag cover. This tear line 102 corresponds to the "linear groove" in the present invention.

The ultrasonic machine 200 shown in FIG. 1 is broadly divided into a drive section 210, a first displacement sensor 220, a second displacement sensor 230, a controller 240, a control section 242, and an output section 244.

The drive section 210 includes a drive arm 212, an ultrasonic transducer 214, an ultrasonic machining blade 216, and an ultrasonic oscillator 218.

The drive arm 212 constitutes one portion of a machining robot, and is controlled based on an input signal from the control section 242, whereby the position, angle, moving locus, and the like of the cutting edge (working tip) 216a of the ultrasonic machining blade 216 are adjusted.

The ultrasonic transducer 214 has the function of propagating ultrasonic waves oscillated in the ultrasonic oscillator 218 to the ultrasonic machining blade 216.

The ultrasonic machining blade 216 serves as a machining blade (blade-shaped member) used for machining the tear line 102 in the cover rear surface 101 of the airbag cover 100, that is, as a so-called "ultrasonic cutter". This ultrasonic machining blade 216 corresponds to the "blade-shaped member" in one embodiment of the present invention, and the cutting edge of the ultrasonic machining blade 216 corresponds to the "working tip" in one embodiment of the present invention. The ultrasonic machining blade 216 is configured so that the entire ultrasonic machining blade 216 including the cutting edge 216a is composed of an electrically conductive material such as iron or an alloy of iron. However, the shape or the material of the cutting edge 216a of the ultrasonic machining blade 216 in this embodiment may be changed as appropriate, as long as a blade-shaped member capable of working on a workpiece by propagating (applying) ultrasonic waves to the workpiece is used. For example, the ultrasonic machining blade 216 may be formed of an electrically conductive material other than iron or an alloy of iron. Here, the ultrasonic oscillator 218 is an oscillator having a mechanism capable of oscillating ultrasonic waves at a predetermined frequency.

Both the first displacement sensor 220 and the second displacement sensor 230 are transmitting displacement sensors capable of sensing the distance therefrom to a predetermined object to be sensed through an object to be passed through. Typically, both the first displacement sensor 220 and the second displacement sensor 230 are comprised of an eddy current displacement sensor or a high-frequency oscillation type electromagnetic induction displacement sensor. The sensing functions of these displacement sensors are well known. The use of these displacement sensors allows the respective distances therefrom to the predetermined object to be directly sensed in a non-contact state through the object to be passed through. According to one embodiment of the invention, the first displacement sensor 220 and the second displacement sensor 230 are paired, and disposed at forward and rearward portions of a predetermined controlled place, respectively. These first and second sensors 220 and 230 constitute the "transmitting displacement sensors" in one embodiment of the present invention.

According to one embodiment of the invention, the airbag cover 100 is taken as an object to be passed through, and the cutting edge 216a (working tip) itself of the ultrasonic machining blade 216 is taken as an object to be sensed, whereupon the object to be sensed is sensed by an eddy current outputted from each of the first and second displacement sensors 220 and 230 (see FIG. 2). With these features, the distances between the cutting edge 216a (working tip) of the ultrasonic machining blade 216 and the sensor surfaces (sensor surfaces 221 and 231 described later) are directly sensed by the first and second transmitting displacement sensors 220 and 230, respectively, through the airbag cover 100.

The control section 242 is electrically connected to the first displacement sensor 220 and the second displacement sensor 230 through the controller 240, and is capable of controlling the relative position of the cutting edge 216a of the ultrasonic machining blade 216 with respect to the airbag cover 100, based on sensed results by the first displacement sensor 220 and the second displacement sensor 230. This control section 242 corresponds to the "control section" in the present invention. Specifically, the control section 242 has the function of controlling the drive section 210 (drive arm 212) to form a tear line 102 with a desired shape in the cover rear surface of the airbag cover 100, and includes known components such as a central processing unit (CPU), ROM, RAM that perform the input of various input data, various calculations, the output of various output data, the storage of data, and the like. For example, information sensed by the first displacement sensor 220 and the second displacement sensor 230, i.e., data on the distance between the cutting edge 216a and each of the sensor surfaces, or/and preset data for the working of airbag cover (e.g., CAD data, CAM data) are inputted to the control section 242 as input data. The control section 242 outputs a control signal, as output data, to the drive arm 212 so that the distances between the cutting edge 216a and the sensor surfaces 221 and 231, sensed by the first and second displacement sensors 220 and 230, respectively, conforms to the respective distances between the cutting edge 216a and the sensor surfaces 221 and 231 at the time when the cutting edge 216a is set up at the position corresponding to a desired depth of the tear line 102, and so that a desired locus of the tear line 102 is formed. The drive arm 212 is controlled based on the above-described control signal, and thereby a desired tear line 102 having a desired shape is formed in the cover rear surface 101 of the airbag cover 100.

Also, the control section 242 outputs, to the output section 244, information on the remaining thickness of the airbag cover 100 after the tear line has actually been machined by the cutting edge 216a, which is typically data obtained by digitizing the airbag cover remaining thickness itself. The output section 244 comprises a screen display means such as a monitor, and outputs data obtained by digitizing the airbag cover remaining thickness to the display screen of the monitor or the like. The data outputted to the output section 244 is recognized by the manufacturing manager.

Figure 3:
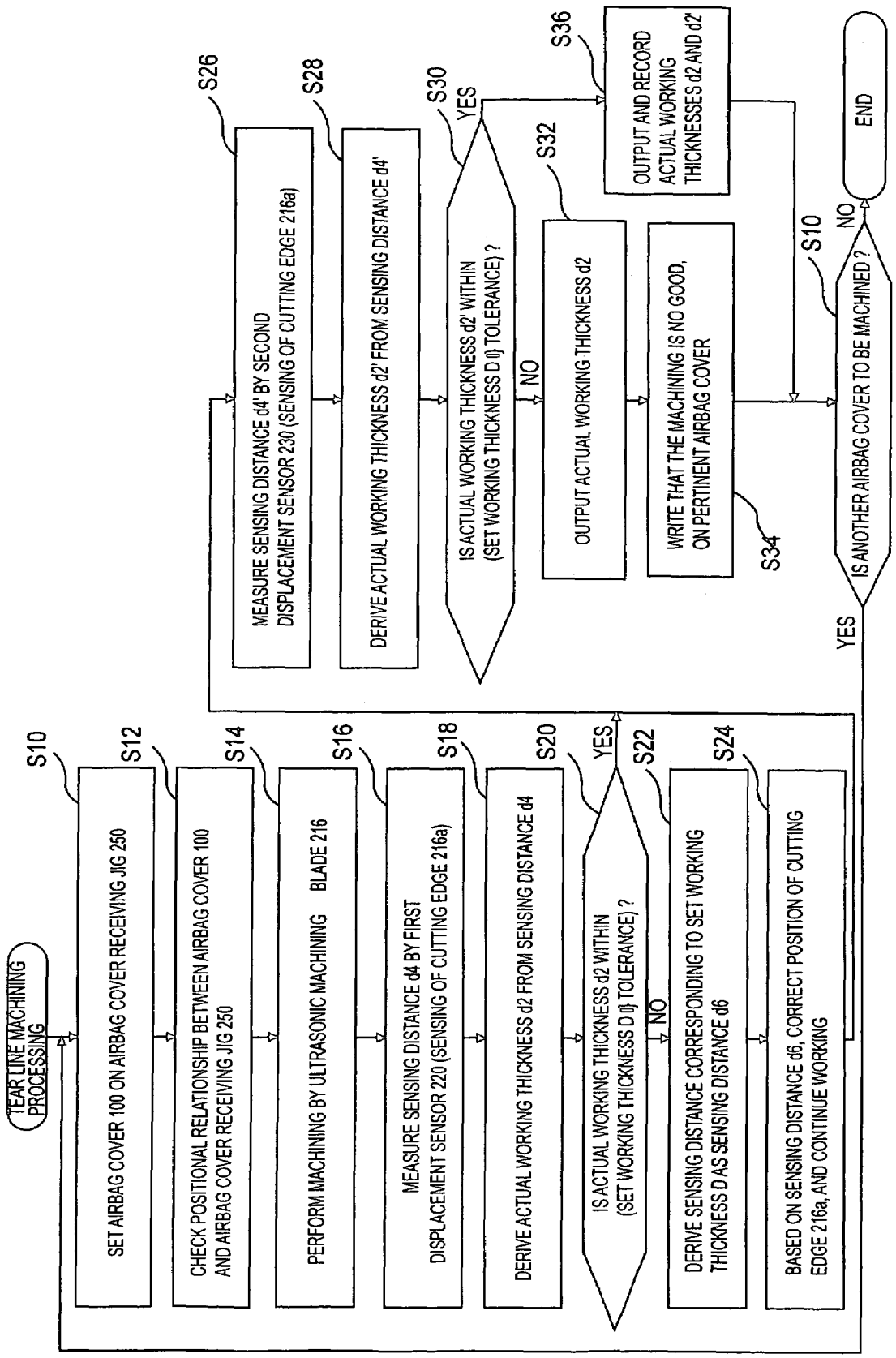
FIG. 3 is a flowchart of the tear line machining process implemented by the ultrasonic machine in FIG. 1.
Figure 4:
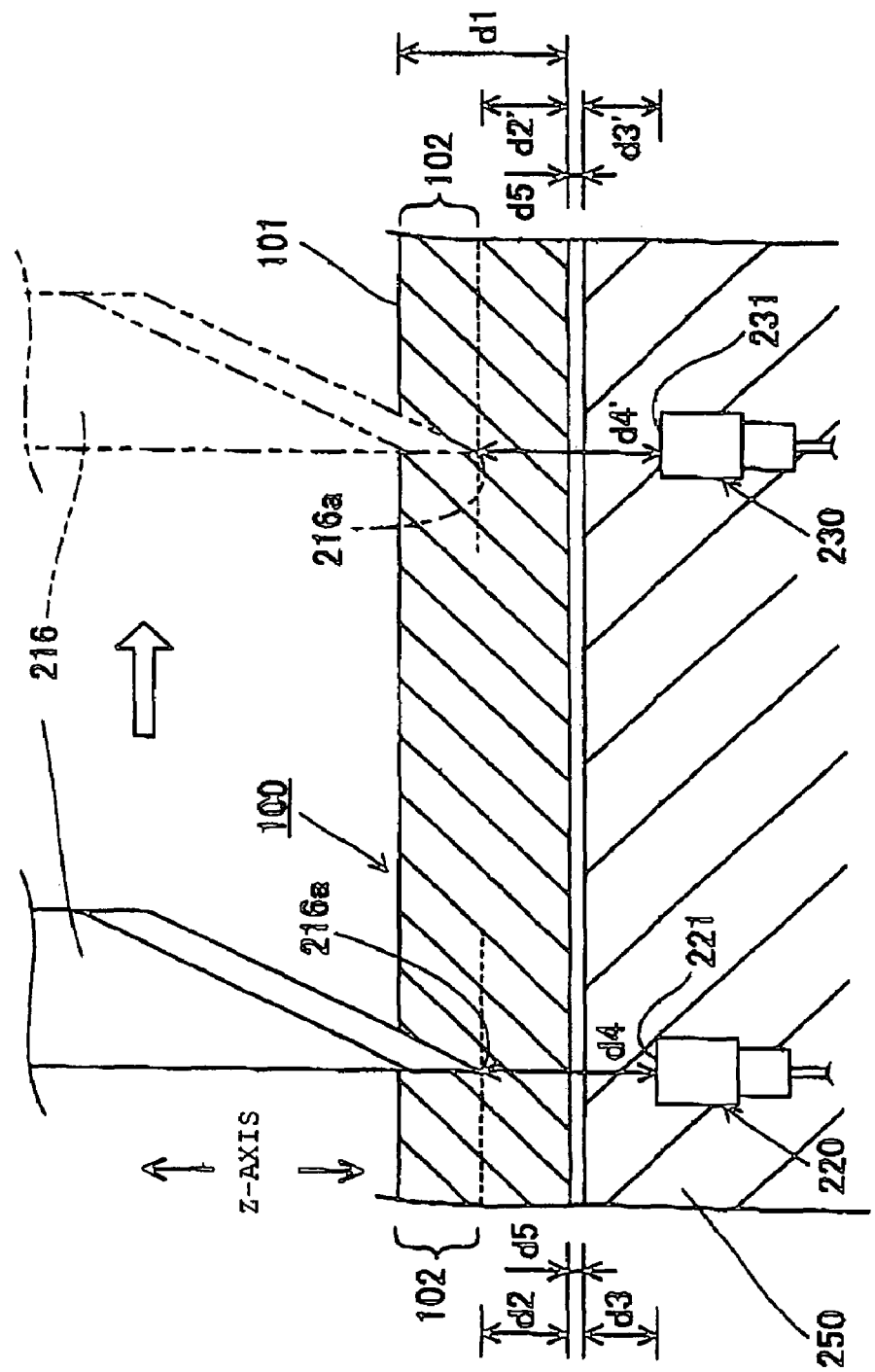
FIG. 4 is a schematic view illustrating the tear line machining process shown in FIG. 3.

Here, the specific usage mode of the ultrasonic machine 200 with the above-described features will be explained with reference to FIGS. 3 and 4. FIG. 3 is a flowchart showing the tear line machining process (i.e., processing in which the tear line 102 is machined in the airbag cover 100) carried out by the ultrasonic machine 200 in FIG. 1. FIG. 4 schematically illustrates the tear line machining process shown in FIG. 3. According to one embodiment of the invention, eddy current type displacement sensors are employed as transmitting type first and second displacement sensors. These first and second displacement sensors 220 and 230 are formed as embedded type sensors that are embedded in the airbag cover receiving jig 250 that receives the airbag cover 100 from below.

As shown in FIG. 3, the tear line machining process carried out by the ultrasonic machined 200 with the above-described features is achieved by sequentially performing the following steps S10 to S36, explained below in detail.

In step S10, shown in FIG. 3, the airbag cover 100, before being subjected to tear line machining, is set up on the airbag cover receiving jig 250. When a tear line is to be formed in the cover rear surface 101 of the airbag cover 100, firstly, the airbag cover 100 is set up on the airbag cover receiving surface of the airbag cover receiving jig 250 so that the cover rear surface 101 becomes upside down, as shown in FIG. 4. Although it is not particularly illustrated, a suction mechanism is mounted on the airbag cover receiving jig 250, and by operating this suction mechanism, the airbag cover 100 is held in a desired position on the airbag cover receiving surface. Thereby, the displacement sensor 220 is disposed on the opposite side of the work surface (cover rear surface 101) of the airbag cover 100 so as to be opposed to the cutting edge 216a with the airbag cover 100 interposed therebetween. Here, the following are measured in advance: the thickness d1 of the airbag cover 100, a distance d3 from the sensor surface 221 (corresponding to the "sensor surface" in the present invention) of the first displacement sensor 220 to the airbag cover receiving surface of the airbag cover receiving jig 250, and a distance d3' from the sensor surface 231 (corresponding to the "sensor surface" in one embodiment of the present invention) of the second displacement sensor 230 to the airbag cover receiving surface of the airbag cover receiving jig 250. The distances d3 and d3' are stored in the control section 242.

In step S12, as shown in FIG. 3, the positional relationship is checked between the airbag cover 100 set up on the airbag cover receiving jig 250 in step S10 and the airbag cover receiving jig 250. Specifically, a distance d5 between the undersurface of the airbag cover 100 and the airbag cover receiving surface of the airbag cover receiving jig 250 is sensed by a sensor with a known construction. This distance d5 is stored in the control section 242.

Then, in step S14 in FIG. 3, actual machining of a tear line is performed by the cutting edge 216a of the ultrasonic machining blade 216. Specifically, the operation of the ultrasonic oscillator 218 and the control of the drive arm 212 by the control section 242 are started. Upon entering its operation, the ultrasonic oscillator 218 oscillates ultrasonic waves at a predetermined frequency, and propagates the ultrasonic waves to the ultrasonic machining blade 216 through the ultrasonic transducer 214. The control section 242 controls the position of the cutting edge 216a of the ultrasonic machining blade 216 by outputting a control signal to the drive arm 212. Thereby, the actual machining of a tear line by the cutting edge 216a is performed. As a working speed of the ultrasonic machining blade 216, e.g., 30 [mm/sec] may be used. Such a working speed is 1.5 times higher than 20 [mm/sec] of the common working speed in laser processing. This is effective in enhancing the manufacturing efficiency of the airbag cover 100.

In step S16 in FIG. 3, the sensing of the cutting edge 216a is performed by the first displacement sensor 220 under the control of the controller 240. Upon startup of the sensing by the first displacement sensor 220, an eddy current flows between the sensor surface 221 and the cutting edge 216a. The impedance of a sensor coil incorporated in a sensor head varies in response to the distance from the sensor surface 221 to the cutting edge 216a. Based on the impedance variations, the distance (sensing distance d4 in FIG. 4) between the sensor surface 221 of the first displacement sensor 220 and the cutting edge 216a are directly sensed. Such sensing by the first displacement sensor 220 may temporarily be performed at one or a plurality of preset controlled places, prior to the start of the working of the airbag cover or during the working of the airbag cover, or alternatively may successively (continuously) be performed during the working of the airbag cover. When the sensing of the sensing distance d4 is temporarily performed at one or a plurality of controlled places prior to the start of the working of the airbag cover or during the working of the airbag cover, one or a plurality of transmitting displacement sensors are fixedly disposed with respect to the airbag cover although the cutting edge 216a is moving under a working process. In contrast, when the sensing of the sensing distance d4 is successively (continuously) performed during the working of the airbag cover, an arrangement can be used in which the transmitting displacement sensor itself is moved in keeping with the movement of the cutting edge 216a.

In step S18 in FIG. 3, based on the sensing distance d4 that has actually been sensed in step S16, an actual working thickness d2 ("airbag cover remaining thickness" at the location where the tear line 102 has been machined) is derived. This actual working thickness d2 is calculated by a calculation formula d2=d4−(d3+d5), using the above-described distances d3, d5, and the sensing distance d4 that has actually been sensed in step S16. The control section 242 stores this formula in advance, and derives the actual working thickness d2 from the previously stored distances d3 and d5, and the sensing distance d4. The control section 242 is capable of deriving the actual working thickness d2 and an actual working thickness d2' described later.

In step S20, in FIG. 3, it is determined whether the actual working thickness d2 derived in step S18 is within a predetermined thickness, namely, whether the actual working thickness d2 is within a set working thickness D±tolerance. Thereby, it is determined whether the tear line machining is progressing so as to form a desired locus. If the actual working thickness d2 is within a set working thickness D±tolerance, i.e., if the determination in step S20 is "YES," the process advances to step S26. On the other hand, if the actual working thickness d2 is not within a set working thickness D±tolerance, i.e., if the determination in step S20 is "NO," the process advances to step S22.

In step S22 in FIG. 3, the sensing distance corresponding to the set working thickness D is derived as a sensing distance d6. Specifically, d2 in the above-described calculation formula is replaced with the set working thickness D, and the sensing distance corresponding to the sensing distance d4 is calculated backward as sensing distance d6. Then, in step S24 in FIG. 3, based on the sensing distance d6 calculated in step S22, the position of the cutting edge 216*a* is adjusted along a vertical direction (Z-axis direction in FIG. 4), and thereafter, the tear line machining by the cutting edge 216*a* is continued.

Next, in steps S26 to S30 in FIG. 3, processing similar to steps S16 to S20 is performed concerning the second displacement sensor 230.

Specifically, in step S26 in FIG. 3, when the cutting edge 216*a* moves up to the position corresponding to the second displacement sensor 230, the sensing of the cutting edge 216*a* by the second displacement sensor 230 is performed under the control of the controller 240. Thereby, the distance (sensing distance d4' in FIG. 4) between the sensor surface 231 of the second displacement sensor 230 and the cutting edge 216*a* is directly sensed.

In step S28 in FIG. 3, based on the sensing distance d4' actually sensed in step S26, an actual working thickness d2' ("airbag cover remaining thickness" at the location where the tear line 102 has been machined) is derived. This actual working thickness d2' is calculated by a calculation formula d2'=d4'−(d3'+d5), using the above-described distances d3', d5, and the sensing distance d4' that has actually been sensed in step S26. The control section 242 stores this formula in advance, and derives the actual working thickness d2' from the previously stored distances d3' and d5 and the sensing distance d4'.

In step S30, in FIG. 3, it is determined whether the actual working thickness d2', derived in step S28, is within a predetermined thickness, namely, whether the actual working thickness d2' is within a set working thickness D±tolerance. Thereby, it is determined whether the tear line machining is progressing so as to form a desired locus. If the actual working thickness d2' is within a set working thickness D±tolerance, i.e., if the determination in step S30 is "YES," the process advances to step S36. On the other hand, if the actual working thickness d2' is not within a set working thickness D±tolerance, i.e., if the determination in step S30 is "NO," the process advances to step S32.

In step S32 in FIG. 3, the actual working thickness d2' derived in step S28 is outputted to the output section (the output section 244 in FIG. 1). Then, in step S34, it is written that the machined airbag cover is no good with machining, on the pertinent airbag cover. On the other hand, in step S36 in FIG. 3, the actual working thickness d2 derived in step S18, and the actual working thickness d2' derived in step S28 are ultimately outputted to the output section (the output section 244 in FIG. 1) and recorded there. The output section 244 is means for outputting the actual working thickness d2 and the actual working thickness d2', and corresponds to the "output section" in the present invention. The data on these actual working thicknesses d2 and d2' having been outputted and recorded in the output section 244 is used for reasonably performing the management of manufacturing histories of products in each of which a linear groove is machined in the airbag cover by post-processing. Above all, since the first and second displacement sensors 220 and 230 according to this embodiment are configured to directly sense the cutting edge 216*a* itself, the data on the actual working thicknesses d2 and d2' having derived from the respective distances directly sensed by these displacement sensors, has high accuracy. Therefore, the ultrasonic machine 200 according to this embodiment is especially effective in performing the management of manufacturing histories of products.

After step S34 or S36 has been completed, it is determined in step S38 whether another airbag is to be tear-line machined. If another airbag cover is to be tear-line machined, i.e., the determination in step S38 is "YES," the process returns to step S10. On the other hand, if another airbag cover is not to be tear-line machined, i.e., the determination in step S38 is "NO," the tear line machining processing ends.

According to one embodiment of the invention, concerning the relative construction between the cutting edge 216*a* of the ultrasonic machining blade 216 and each of the first and second displacement sensors 220 and 230, the area of the cutting edge 216*a*, namely, the area (S1) occupied by the portion contributing to the machining of the tear line 102 in the airbag cover 100 is set to be not more than 1.5 times with respect to the area of the sensor surfaces 221 and 231, namely, the area (S2) occupied by the portion contributing to the sensing of the cutting edge 216*a* of all portions of the sensor surface. Such a construction allows the distance between each of the sensor surfaces 221 and 231 and the cutting edge 216*a* to be sensed with higher accuracy. Instead of these constructions, the area (S2) of the sensor surfaces 221 and 231 of the first and second displacement sensors 220 and 230 may also be set to be not less than ⅔ times with respect to the area (S1) of the cutting edge 216*a*. The ratio between the area (S1) and the area (S2) may be changed as appropriate depending on the specifications or the like of the first displacement sensor 220 and/or the second displacement sensor 230. Here, provided that the area (S1) is not more than 1.5 times the area (S2), the combination of the area (S1) and the area (S2) can be changed.

Also, in this embodiment, since the ultrasonic machining blade 216 having the cutting edge 216*a* is formed of an electrically conductive material such as iron or an alloy of iron, it is possible to further enhance the sensing accuracy of the first and second displacement sensors 220 and 230 with respect to the cutting edge 216*a*.

Thus, the use of the first and second displacement sensors 220 and 230 that directly sense the respective distances therefrom to the cutting edge 216*a* of the ultrasonic machining blade 216 through the airbag cover 100 enables a tear line 102 having a desired shape to be machined in the airbag cover 100 with high accuracy. Such a tear line 102 accurately machined provides a tear line that is to be torn open so as to deploy and inflate a vehicle airbag toward an occupant protection area smoothly and reliably in a desired manner.

The present invention is not limited to the above-described embodiment, but various applications and modifications thereof are possible. For example, the following modifications to which the above-described embodiment is applied can be implemented.

In the above-described embodiment, the case has been set forth in which the ultrasonic machining blade 216 is used for forming the tear line 102 in the cover rear surface 101 of the airbag cover 100. However, according to another embodiment of the invention, instead of the ultrasonic machining blade 216, one of various kinds of cutters used for cutting work such as a blade, a rotary blade, a thermal blade, a drill, an end mill, a needle or a waterjet nozzle can also be employed as a blade-shaped member. In this case, it is possible to accurately sense the distance between the cutting edge of the above-described machining blade and each of the sensor surfaces 221 and 231 by the first and second displacement sensors 220 and 230, as in the case where the ultrasonic machining blade 216 is employed.

Also, the case has been set forth in which the ultrasonic machining blade 216 including the cutting edge 216a is formed of an electrically conductive material such as iron or an alloy of iron. However, according to another embodiment of the present invention, the cutting edge 216a can also be formed of a material other than an electrically conductive material, as long as the cutting edge 216a has a strength enough to form a tear line 102 in the airbag cover 100, and it can be sensed by the first displacement sensor 220 and the second displacement sensor 230.

Furthermore, the case has been set forth in which the first displacement sensor 220 and the second displacement sensor 230 are paired and disposed in at least one predetermined controlled place. However, according to another embodiment of the present invention, the number of controlled places, and the number of displacement sensors to be disposed at one controlled place are not limited, but can be changed as appropriate when necessary. For example, an arrangement can also be used in which at least two sensors such as a first displacement sensor 220 and a second displacement sensor 230 comprise one set, and a plurality of the sets are disposed at a plurality of controlled places, or in which either one of the first displacement sensor 220 and the second displacement sensor 230 is disposed at one controlled place or at each controlled place out of a plurality of controlled places.

Moreover, in the above-described embodiment, the arrangement has been set forth in which the data itself on the actual working thickness d2 or the actual working thickness d2' is displayed by the output section 244 on the screen thereof. However, according to another embodiment of the present invention, an arrangement can also be used in which the above-described data is outputted by printing means such as a printer, or voice outputting means such as a speaker. In addition, instead of outputting the data itself on the actual working thickness d2 and the actual working thickness d2', data capable of expressing, by a grade, the remaining thickness level of the airbag cover in correspondence with the actual working thickness d2 and the actual working thickness d2', can be outputted by a display, printing, voice, or the like.

The priority application, Japanese Patent Application No. 2004-222585, filed Jul. 29, 2004, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An apparatus for manufacturing an airbag cover for covering a vehicle airbag, the apparatus forming a linear groove in a work surface of the airbag cover, the groove having a depth falling within the range of the thickness of the airbag cover, the apparatus comprising:
   a blade for machining the linear groove in the work surface;
   a transmitting displacement sensor disposed on the opposite side of the work surface of the airbag cover so as to be opposed to a working tip of the blade with the airbag cover interposed therebetween, wherein the working tip of the blade is directly sensed by the transmitting displacement sensor and the transmitting displacement sensor directly senses the distance between the working tip of the blade and a sensor surface of the sensor through the airbag cover; and
   a control section for controlling the relative position of the working tip with respect to the airbag cover, based on the distance sensed by the transmitting displacement sensor.

2. The apparatus of claim 1, wherein the blade is configured so that the working tip has an area of not more than 1.5 times the area of the sensor surface of the transmitting displacement sensor.

3. The apparatus of claim 1, wherein the blade is configured so that the working tip is composed of an electrically conductive material.

4. The apparatus of claim 1, wherein the control section is configured to derive information on the remaining thickness of the airbag cover in the linear groove after the linear groove has been machined in the work surface of the airbag cover based on the distance between the sensor surface of the transmitting displacement sensor and the working tip of the blade, the distance having been directly sensed by the transmitting displacement sensor.

5. The apparatus of claim 1, further comprising an output section for outputting information derived by the control section.

* * * * *